United States Patent [19]

Wobbe

[11] Patent Number: 5,335,991
[45] Date of Patent: Aug. 9, 1994

[54] PLASTIC MELT EXTRUDER HAVING AN ADJUSTABLE THROTTLING GAP OF NON-UNIFORM WIDTH

[75] Inventor: Hans Wobbe, Malmsheim, Fed. Rep. of Germany

[73] Assignee: Werner & Pfleiderer GmbH, Stuttgart, Fed. Rep. of Germany

[21] Appl. No.: 83,058

[22] Filed: Jun. 25, 1993

[30] Foreign Application Priority Data

Jul. 14, 1992 [DE] Fed. Rep. of Germany ....... 4223043

[51] Int. Cl.$^5$ .............................................. B29B 1/04
[52] U.S. Cl. ............................................ 366/79; 366/87
[58] Field of Search ..................... 366/76, 77, 79, 80, 366/83, 84, 85, 87, 88, 89, 90, 318, 323, 324, 322; 425/382.2, 382.4, 204, 207, 208, 209

[56] References Cited

U.S. PATENT DOCUMENTS

| | | | |
|---|---|---|---|
| 4,332,481 | 6/1982 | Inoue | 366/84 |
| 4,462,691 | 7/1984 | Boguslawski | 366/90 |
| 5,102,602 | 4/1992 | Ziegler | 425/382.4 |
| 5,147,198 | 9/1992 | Capelle | 425/382.4 |

FOREIGN PATENT DOCUMENTS 2924269  6/1979  Fed. Rep. of Germany .

Primary Examiner—Robert W. Jenkins
Attorney, Agent, or Firm—Ladas & Parry

[57] ABSTRACT

An extruder for processing plastic material has a housing with a longitudinal bore in which an extruder screw is coaxially fitted for rotation around an axis of the screw to advance plastic material through the bore by threads on the screw. A plurality of throttling plungers are slidably supported in rectangular slots in the housing perpendicular to the axis of the screw. The throttling plungers define an inner throttling surface facing an outer thread-free region of the screw to form an annular throttle gap therewith. In order to avoid uncontrolled changes in the throttling system, the throttling surfaces are not concentric with the outer surface of the screw, so that the throttle gap has a width which varies progressively and symmetrically around the screw.

14 Claims, 2 Drawing Sheets

PLASTIC MELT EXTRUDER HAVING AN ADJUSTABLE THROTTLING GAP OF NON-UNIFORM WIDTH

FIELD OF THE INVENTION

The invention relates to an extruder, for the processing of plastic materials, having a housing containing a rotatable extruder screw in a longitudinal bore in the housing. A radial slot is provided in the housing at right angles to the longitudinal bore and a flat throttle plunger is slidably supported in the slot. The throttle plunger has an inner surface facing a thread-free region of the extruder screw to form an annular throttle gap therewith. The width of the gap can be regulated by the throttle plunger to vary the degree of throttling.

BACKGROUND AND PRIOR ART

A screw extruder is disclosed in DE 29 24 269 A, in which displaceable pressure plungers are arranged in the extruder housing normal to the extruder screw to control the flow cross section for the plastic material. This has substantial influence on the most important parameters in regard to the material being processed, namely pressure and temperature. Other factors affecting the processing are the heat supplied to the extruder housing and the viscosity of the material being processed. Control of the flow cross section is usually effected by a so-called on-line quality regulator, by which regulation of the quality of the product is achieved as a function of measured results of the product. It has been found that even small changes in the flow cross section affect the quality of the product.

Especially in the case of an arrangement with several throttle plungers, it is therefore a disadvantage if the flow cross section formed by several throttle surfaces can, depending on the magnitude of the gap, produce a gap of varying width over the circumference of the extruder screw. This is especially the case when a relatively large change in the size of the gap is contemplated.

However, eccentricity during operation, which is caused by the weight of the extruder screw, can lead in the long term, to undesirable changes in the throttling system especially in the case of large volume extruders. In addition, greatly varying radial forces, which produce bending moments on the shaft of the extruder screw also act during steady state operation because of the varying gap widths over the circumference of the extruder screw.

SUMMARY OF THE INVENTION

An object of the invention is to provide an extruder in which uncontrolled changes in the effectiveness of the throttling system are prevented during operational running and minimum deviation of the extruder shaft from its ideal axial position is ensured.

The object is accomplished, in accordance with the invention, in that the throttling surface of each throttle plunger starting from the longitudinal axis of the throttle plunger extends on both sides in the circumferential direction of the extruder screw with a curvature deviating from the circular shape of the outer contour of the screw to form a throttle gap with the outer contour of the screw which varies uniformly over the circumference of the screw.

Surprisingly, it has been found in this way that as a result of adjusting the throttling system for different gap widths during operation of the screw (or of two screws in a dual screw extruder) uniform cross sectional flow is achieved in the long term as a result of equal throttling action over the circumference of the gap.

In the case of eccentric rotary behavior of the extruder screw or screws, moreover, wear in an edge region of the throttle plunger, which is produced in particular in the open state of the throttle system, is considerably reduced.

DETAILED DESCRIPTION OF A PREFERRED EMBODIMENT

Figure 1:
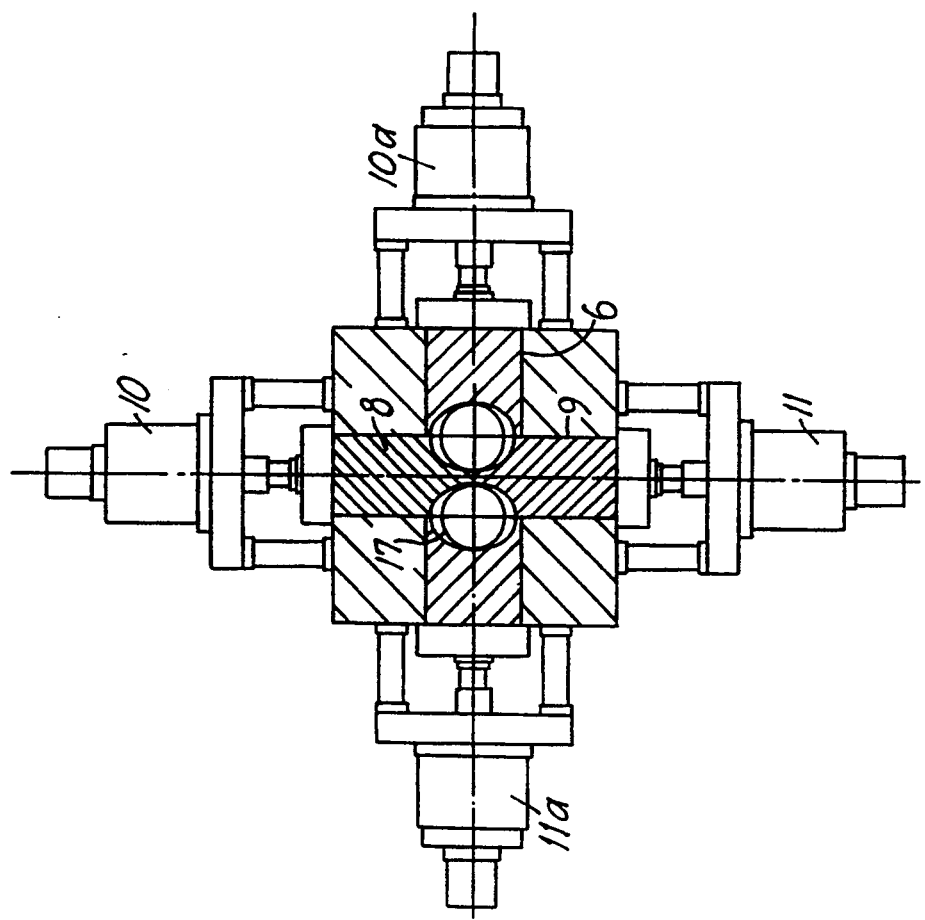
FIG. 1 is a longitudinal cross sectional view of a dual screw extruder with a throttle plunger system.
Figure 2:
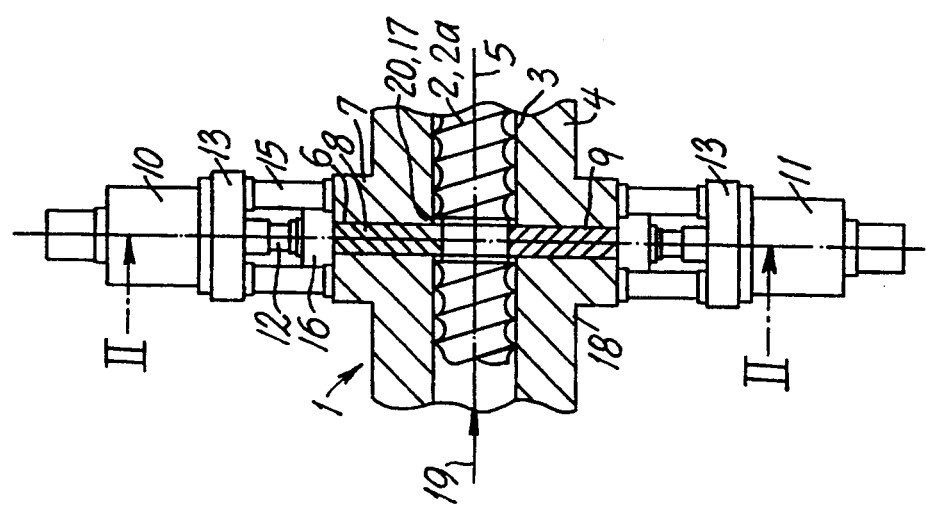
FIG. 2 is a sectional view taken through a throttling zone of the extruder along line II—II in FIG. 1

Referring to FIGS. 1 and 2, therein is shown an extruder 1 for processing plastic material having a housing 4 with parallel, longitudinal bores 3 coaxially supporting respective extruder screws 2, 2a for rotation about respective axes 5 of the screws under the action of a drive means (not shown). The screws 2, 2a advance the plastic material through the bores by threads on the screws. The screws 2, 2a have thread-free regions 18 at which flow of the plastic material is controlled by throttle plungers 8, 9, 8a, 9a.

At the thread-free regions 18 of the screws, the housing 4 has a reinforcement enlargement 7 in which radial slots 6 of rectangular cross-section are provided. The radial slots 6 extend in pairs at right angles to one another and to the axes 5 of the screws 2, 2a. The throttle plungers 8, 9 are fitted in one pair of slots 6 and extend horizontally in FIGS. 2 and 3 and the throttle plungers 8a, 9a form a second pair fitted in slots 6 extending vertically in FIGS. 2 and 3.

The throttle plungers 8, 9, 8a, 9a are each of rectangular cross-section and are respectively slidable in their slots 6 and controllably displaced by respective drive motors 10, 11, 10a, 11a. The drives of the plungers are identical and description will hereafter be given for the drive of throttle plunger 8. Hereby, the drive motor 10 drives a piston 12 which is connected by a flange 16 to throttle plunger 8 whereby drive of motor 10 will produce slidable movement of throttle plunger 8 in either direction. The drive motor 10 can be driven electrically or hydraulically. The drive motor 10 is rigidly connected to housing 4 by cross beam 13 and long bolts 15.

The throttle plungers have inner surfaces facing outer contours of the thread-free regions 18 of screws 2, 2a to form annular throttle gaps 17 therewith for controlling flow of plastic material, which has been melted in the extruder 1, in the direction 19 in FIG. 1.

Figure 3:
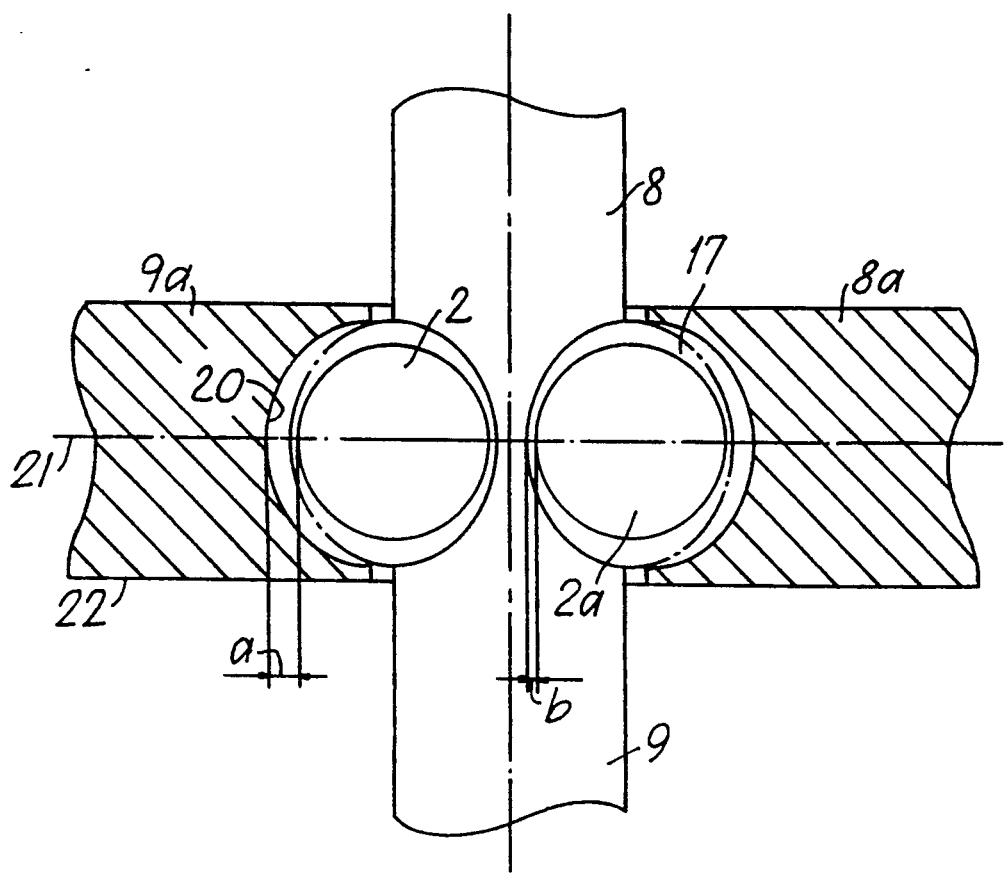
FIG. 3 is a sectional view on enlarged scale of a portion of FIG. 2 in a more schematic illustration.

As best seen in FIG. 3, the throttle plunger 9a has its inner surface 20 facing the thread-free outer surface of screw 2. The plunger 9a is shown in solid lines in fully open state for minimum or no throttling of the flow of plastic material and in chain-dotted outline in fully closed state for maximum throttling. The surface 20 extends over approximately 180° of the circumferential extent of screw 2. In the open position, the surface 20 forms a uniform gap having a width "a". In a throttling position, the surface 20 of the plunger 9a is no longer concentric with the circular contour of screw 2 and the width of the gap 17 progressively varies over the circumference of the screw. By way of example, in the fully throttled or closed state of the throttle plunger 9a, the width of the gap varies from a minimum value "b" along horizontal axis 21 (the longitudinal axis of displacement of the throttle plungers 8a, 9a) to the maximum value "a" on the vertical axis of screw 2. The value "b" represents the minimum size of the gap and corresponds to the conventional operating play between the surface 20 and the outer surface of the screw in the closed state.

In the throttling positions of the plunger 8, 9, the width of the gap 17 progressively varies uniformly and symmetrically around the screw.

The plungers 8 and 9 are shown in the closed position and each plunger has two throttling surfaces each extending over approximately 90° of the circumferential extent of a respective screw 2 or 2a.

Although the invention has been described in conjunction with a specific embodiment thereof, it will become apparent to those skilled in the art that numerous modifications and variations can be made within the scope and spirit of the invention as defined in the attached claims.

What is claimed is:

1. An extruder for processing plastic material comprising a housing having a longitudinal bore, an extruder screw coaxially fitted in said bore for rotation around an axis of the screw to advance plastic material through said bore by threads on said screw, plunger means supported in said housing perpendicular to the axis of said screw, said plunger means providing an inner surface facing an outer contour of said screw to form an annular gap therewith, said inner surface of said plunger means being eccentrically offset from said outer contour of said screw to provide said annular gap with a width which progressively varies over the circumference of said screw in a throttling position of the plunger means.

2. An extruder as claimed in claim 1, wherein said screw includes a thread-free region which forms said outer contour facing the inner surface of said plunger means, said outer contour being circular, said inner surface being non-concentric with said outer contour in said throttling position.

3. An extruder as claimed in claim 2, wherein said gap varies from a minimum value in a first longitudinal plane passing through said axis of the screw to a maximum value in a second longitudinal plane passing through said axis perpendicular to said first plane.

4. An extruder as claimed in claim 3, wherein said first plane is horizontal and said second plane is vertical.

5. An extruder as claimed in claim 1, wherein said housing has a slot extending at right angles to the axis of said screw in which said plunger means is slidably supported, said extruder further comprising means for displacing said plunger means in said slot to adjust the width of said gap.

6. An extruder as claimed in claim 1, wherein said inner surface of said plunger means has a curvature related to said outer contour of the screw such that displacement of said plunger means changes the variation of the width of the gap over the circumference of the screw.

7. An extruder as claimed in claim 1, wherein said gap has a minimum value equal to normal play of said screw in said longitudinal bore.

8. An extruder as claimed in claim 1, wherein said width of said gap varies uniformly over the circumference of the screw.

9. An extruder as claimed in claim 8, wherein said plunger means and said slot have flat surfaces to limit travel of said plunger means to relative slidable movement in said housing.

10. An extruder as claimed in claim 1, wherein said housing has a second longitudinal bore extending parallel to the first said bore and a second extruder screw in said second bore, said plunger means comprising two pairs of throttle plungers at right angles to one another, the throttle plunger in each pair being axially aligned, said housing having slots at right angles to one another in which the pairs of throttle plungers are slidably supported.

11. An extruder as claimed in claim 10, wherein the throttle plungers of a first of said pairs of throttle plungers have inner surfaces facing a respective one of said screws extending over approximately 180° of the outer contour of the respective screw, the throttle plungers of the second of said pairs of throttle plungers having inner surfaces respectively extending over approximately 90° of the outer contours of both screws.

12. An extruder as claimed in claim 1, wherein said plunger means includes a throttle plunger whose inner surface extends over approximately 180° of the outer contour of said screw.

13. An extruder as claimed in claim 12, wherein said housing has a slot extending at right angles to the axis of said screw, said throttle plunger being slidably supported in said slot, said extruder further comprising means for displacing said throttle plunger in said slot to adjust the width of said gap.

14. An extruder as claimed in claim 1, wherein the width of said annular gap progressively varies symmetrically around said screw.

* * * * *